United States Patent [19]

Kawashima et al.

[11] Patent Number: 5,708,544
[45] Date of Patent: Jan. 13, 1998

[54] MAGNETIC HEAD

[75] Inventors: Takashi Kawashima; Yutaka Okazaki, both of Miyagi, Japan

[73] Assignee: Sony Corporation, Tokyo, Japan

[21] Appl. No.: 845,695

[22] Filed: Apr. 25, 1997

Related U.S. Application Data

[63] Continuation of Ser. No. 517,830, Aug. 22, 1995, abandoned.

[30] Foreign Application Priority Data

Aug. 22, 1994 [JP] Japan ................................ 6-196615
Mar. 10, 1995 [JP] Japan ................................ 7-051362

[51] Int. Cl.$^6$ ........................... G11B 5/23; G11B 5/235
[52] U.S. Cl. ............................. 360/119; 360/120
[58] Field of Search ........................... 360/119, 120

[56] References Cited

U.S. PATENT DOCUMENTS

| | | | |
|---|---|---|---|
| 4,815,197 | 3/1989 | Ota et al. | 360/120 X |
| 4,821,406 | 4/1989 | Ota | 360/120 X |
| 5,164,870 | 11/1992 | Kato et al. | 360/119 |
| 5,452,164 | 9/1995 | Cole et al. | 360/119 X |

*Primary Examiner*—John H. Wolff
*Attorney, Agent, or Firm*—Hill, Steadman & Simpson

[57] ABSTRACT

A magnetic head, in the form of a MIG head, having a magnetic metal film formed in the vicinity of the magnetic gap, is provided, in which the thickness of the magnetic metal film in a direction perpendicular to the magnetic gap is not less than 1.0 μm and not more than 4.4 μm and the gap length of the magnetic gap is 0.23 μm to 0.32 μm. The magnetic head is improved in recording characteristics in a specified short wavelength range and hence in the playback output so that it may be advantageously employed for a high digital recording format.

7 Claims, 3 Drawing Sheets

5,708,544

MAGNETIC HEAD

This is a continuation of application Ser. No. 08/517,830 filed Aug. 22, 1995, now abandoned.

BACKGROUND OF THE INVENTION

This invention relates to a magnetic head advantageously employed for a high density recording format and, more particularly, to such magnetic head having improved recording characteristics.

A digital data streamer, which is a digital data streamer employing a helical scan system, referred to herein as DDS, and a data 8 mm, referred to herein as D-8, represent the application of the format of a digital audio tape recorder, referred to herein as R-DAT, and the format of a 8 mm video tape recorder, respectively.

Consequently, with the conventional DDS or D-8 formats, the same metal-in-gap (MIG) head is simultaneously used for recording and reproduction, as in the case of audio and video devices. The MIG head has a magnetic metal film of high saturation magnetic flux density in its magnetic gap portion, so that it has its output increased as compared to a magnetic head formed only of ferrite in order to enable recording/reproduction on or from a high coercivity metal tape.

The MIG head usually has a magnetic metal film of increased film thickness for improving recording/playback characteristics of long-waveform signals, that is color or chroma signals.

On the other hand, analyses of frequency dependency characteristics of the absolute power in the current magnetic recording system indicate that the absolute power is deteriorated towards a higher frequency range, that is towards a shorter wavelength range.

However, with the magnetic recording system, it is crucial to improve the output (C/N) at the shortest recording wavelength of 1T and at twice the shortest recording wavelength 2T for the conventional integration detection (peak detection) system and for the partial response system, respectively.

Thus it is among crucial tasks to improve the output for the short wavelength range for realization of high density recording.

For meeting such demand, it is not advantageous to employ a magnetic head with an increased magnetic metal film thickness having a broad recording magnetic field, while it is advantageous to employ a magnetic head with a reduced magnetic metal film thickness having a steep recording magnetic field.

Based on the presupposition that a magnetic head with a reduced film thickness of the magnetic metal film is meritorious for a high density digital recording format, it has been researched by the present Assignee which film thickness of the magnetic metal film is most desirable.

OBJECT AND SUMMARY OF THE INVENTION

It is therefore an object of the present invention to provide a magnetic head which is improved in playback output and which may be advantageously employed for a high density digital recording format by improving recording characteristics in a specified short wavelength range.

The magnetic head according to the present invention is a MIG head having a magnetic metal film formed in at least the magnetic gap region thereof. With such MIG head, the film thickness of the magnetic metal film and the gap length of the magnetic gap are defined for accomplishing the above object.

That is, the thickness of the magnetic metal film in a direction perpendicular to the magnetic gap is not less than 1.0 µm and not more than 4.4 µm and the gap length of the magnetic gap is 0.23 µm to 0.32 µm.

According to the present invention, the thickness of the magnetic recording medium in a direction perpendicular to the magnetic gap and the gap length of the magnetic gap are set to specified values for improving recording characteristics for specified short wavelength signals for thereby improving playback characteristics. Thus, with a magnetic recording apparatus on which a recording head can be loaded separately from a playback head, high density recording and hence a high capacity and a low error rate may be achieved.

DESCRIPTION OF THE PREFERRED EMBODIMENT

Figure 1:
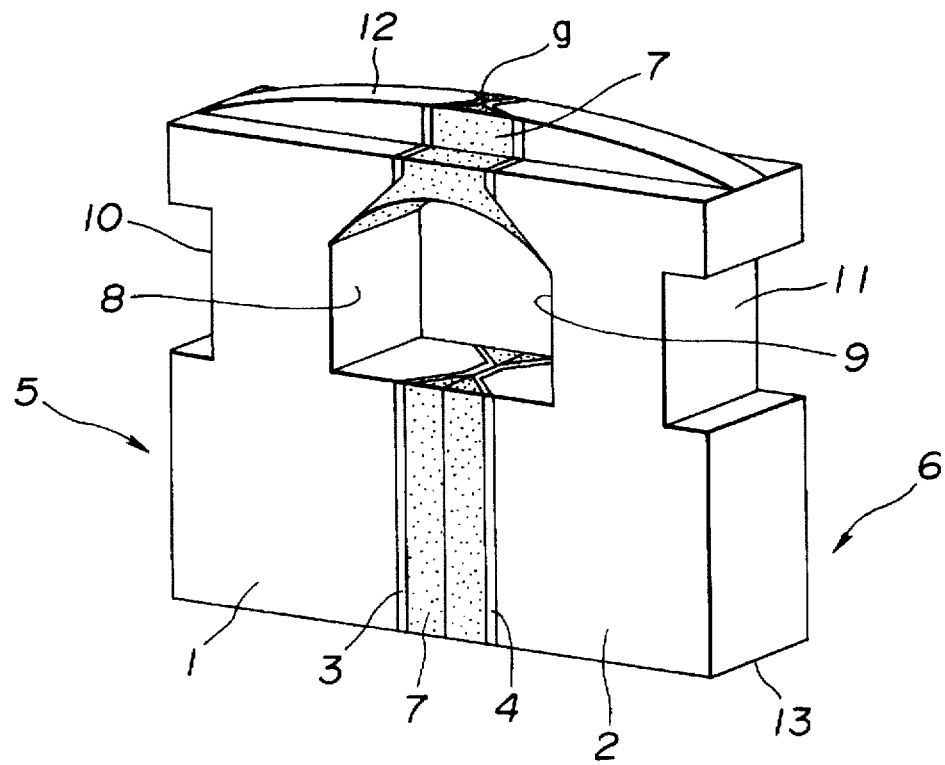
FIG. 1 is a perspective view showing an illustrative magnetic head according to the present invention.

Referring to the drawings, a preferred embodiment of the present invention.

Figure 2:
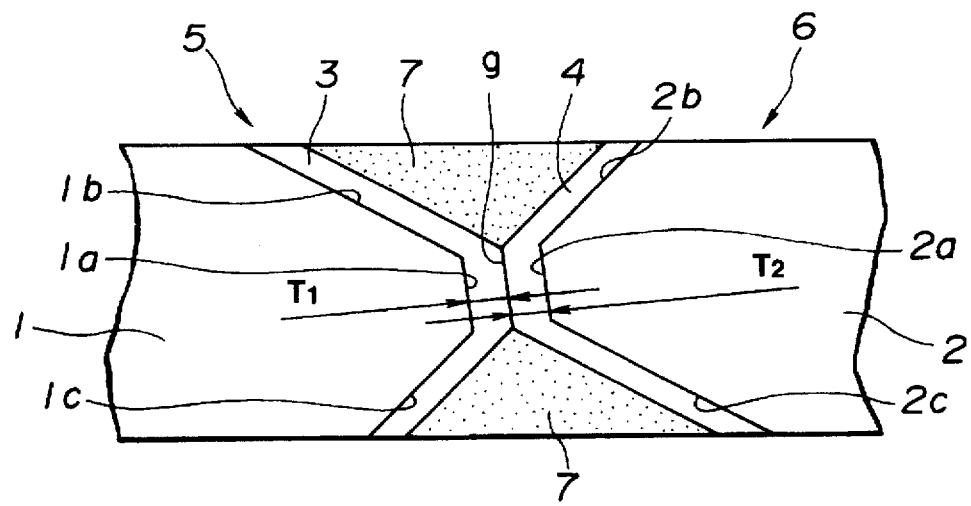
FIG. 2 is an enlarged schematic plan view showing a surface of the magnetic head in the vicinity of the magnetic gap configured for having sliding contact with the magnetic recording medium.

A magnetic head of the illustrated embodiment is comprised of a pair of magnetic core halves 5, 6, made up of a pair of auxiliary cores 1, 2 of a magnetic oxide material, such as ferrite, and a pair of magnetic metal films 3, 4, with the auxiliary cores 1, 2 being unified to each other by glass 7 charged in a space between the magnetic metal films as confronting surfaces, as shown in FIGS. 1 and 2.

The confronting surfaces of the auxiliary cores 1, 2, on which the magnetic metal films 3, 4 are formed, are substantially trapezoidally-shaped in plan view. That is, the confronting surfaces of the auxiliary cores 1, 2 are comprised of planar surfaces 1a, 2a extending parallel to the magnetic gap g and inclined surfaces 1b, 1c, 2b, 2c formed on both sides of the planar surfaces 1a, 2a, so that the confronting surfaces are substantially trapezoidally-shaped in plan view.

These confronting surfaces of the auxiliary cores 1, 2 are formed with winding slots 8, 9 in which to place coils, not shown. These winding slots 8, 9 are formed as windows traversing the auxiliary cores 1, 2 at a mid portion of a substrate portion along the direction of depth of the magnetic gap g.

The sides of the auxiliary cores 1, 2 opposite to the winding slots 8, 9 are respectively formed with auxiliary winding slots 10, 11 for optimizing the winding state of the coils placed in the winding slots 8, 9. These auxiliary winding slots 10, 11 are formed in the sides of the auxiliary cores 1, 2 in the forms of grooves each having a U-shaped cross-section.

On the other hand, the magnetic metal films 3, 4 are formed along the confronting surfaces of the auxiliary cores 1, 2 for extending towards a back surface 13 from a surface 12 configured for having sliding contact with a magnetic recording medium. The magnetic metal films 3, 4, however, are not formed within the winding slots 8, 9.

These magnetic metal films 3, 4 are formed of a magnetic material having high saturation magnetic flux density and superior soft magnetic properties. For these magnetic materials, those routinely employed for this purpose may be employed, whether crystalline or amorphous.

These magnetic materials may be enumerated by alloys of magnetic metals, such as Fe—Al—Si based alloys, Fe—Al based alloys, Fe—Si—Co based alloys, Fe—Ni based alloys, Fe—Al—Ge based alloys, Fe—Ga—Ge based alloys, Fe—Si—Ge based alloys or Fe—Co—Si—Al based alloys, Fe—Ga—Si based alloys, and alloys basically composed of Fe, Ga, Co, optionally substituting part of Fe, and Si, and admixed with at least one element selected from among Ti, Cr, Mn, Zr, Nb, Mo, Ta, W, Ru, Os, Rh, Ir, Re, Ni, Pd, Pt, Hf and V, for further improving corrosion resistance and abrasion resistance of the Fe—Ga—Si based alloys.

It is also possible to employ an amorphous magnetic metal alloys, or so-called amorphous alloys. These amorphous alloys may be enumerated by metal-metalloid based amorphous alloys, such as alloys composed of at least one element selected from among Fe, Ni and Co and one or more elements selected from among the elements P, C, B and Si or alloys mainly composed of these alloys and also containing Al, Ge, Be, Sn, In, Mo, W, Ti, Mn, Cr, Zr, Hf or Nb, and metal-metal based amorphous alloys mainly composed of transition elements, such as Co, Hf or Zr and rare earth elements.

These magnetic metal films 3, 4 are formed by vacuum thin film forming techniques, typified by the vacuum deposition method, sputtering method, ion plating method or cluster ion beam method.

The magnetic core halves 5, 6, made up of the auxiliary cores 1, 2 and thin magnetic metal films 3, 4 as described above, are unified together by glass fusion, with the magnetic metal films 3, 4, formed on the planar surfaces 1a, 2a, abutting to each other with a gap film in-between. The magnetic gap g, operating as a recording gap, is formed between the abutting surfaces of the confronting magnetic metal films 3, 4.

With the magnetic head of the illustrated embodiment, the thicknesses $T_1$, $T_2$ of the magnetic metal films 3, 4 in a direction perpendicular to the magnetic gap g are selected to be not less than 1.0 μm and not more than 4.4 μm, while the gap length of the magnetic gap g is selected to be 0.23 μm to 0.32 μm, for improving the recording characteristics of short wavelength signals having wavelengths ranging between 0.4 μm and 0.7 μm. The fact that the above given values of the film thickness of the magnetic metal films 3, 4 and the gap length leads to improved recording characteristics of the short wavelength signals has been confirmed by the following experiment.

EXPERIMENT 1

For finding the relation between the gap length of the magnetic gap g and recording characteristics, several different sorts of magnetic heads (MIG heads) having different gap lengths were prepared and comparative measurements were made of playback outputs with the use of the magnetic heads as recording heads. For measurement, the relative velocity between the tape and the head was set to 3.13 m/s. As the tape, a coated metal tape having the saturation magnetic flux density in the longitudinal direction Bm=341 mT, coercivity Hc of 131 kA/m and a rectangular ratio S=0.90, was used. As a playback head, a MIG head having a gap length equal to 0.25 μm was employed in common. Therefore, the difference in the playback output directly means the difference in the recording characteristics.

Figure 3:
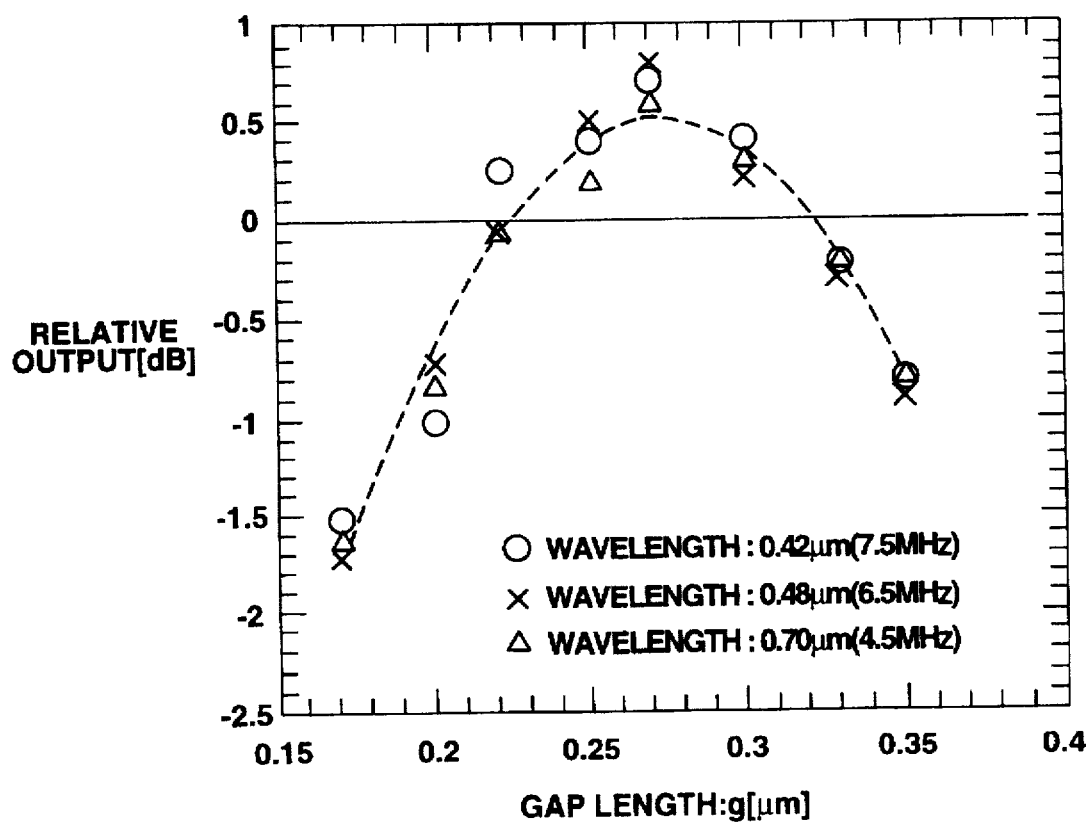
FIG. 3 is a graph showing magnetic gap length dependency of recording characteristics.

FIG. 3 shows relative values of the playback output at respective recording wavelengths with the use of magnetic heads of different gap lengths as the recording heads, that is the gap length dependency of the recording characteristics. In the drawing, a broken line represents an approximate quadrature curve for data for the respective wavelengths. The ordinate and the abscissa denote playback characteristics of the respective magnetic heads in terms of relative outputs for the peak output of the approximate curve of +0.5 dB, and the gap lengths of the respective magnetic heads, respectively.

It is seen from these results that, for realizing an output within −0.5 dB (0 dB or more in the drawing) from the peak output for the signals having the wavelength ranging from 0.4 μm to 0.7 μm, it suffices to set the gap length of the recording head so as to be in a range from 0.23 to 0.32 μm.

EXPERIMENT 2

For finding the relation between the recording characteristics and the thickness of the magnetic recording film in the vicinity of the magnetic gap, several different sorts of magnetic heads (MIG heads) having different film thicknesses of the magnetic metal films were prepared and comparative measurements were made of the playback output with the use of these magnetic heads as recording heads. As for the measurement conditions, the relative velocity between the tape and the head was set to 3.13 m/s, as in the experiment 1, while a coated metal tape was used as the tape, again as in the experiment 1.

As a playback head, a MIG head having a gap length equal to 0.25 μm was employed in common, as in the case of the experiment 1. Consequently, the difference in the playback output directly means the difference in the recording characteristics.

Figure 4:
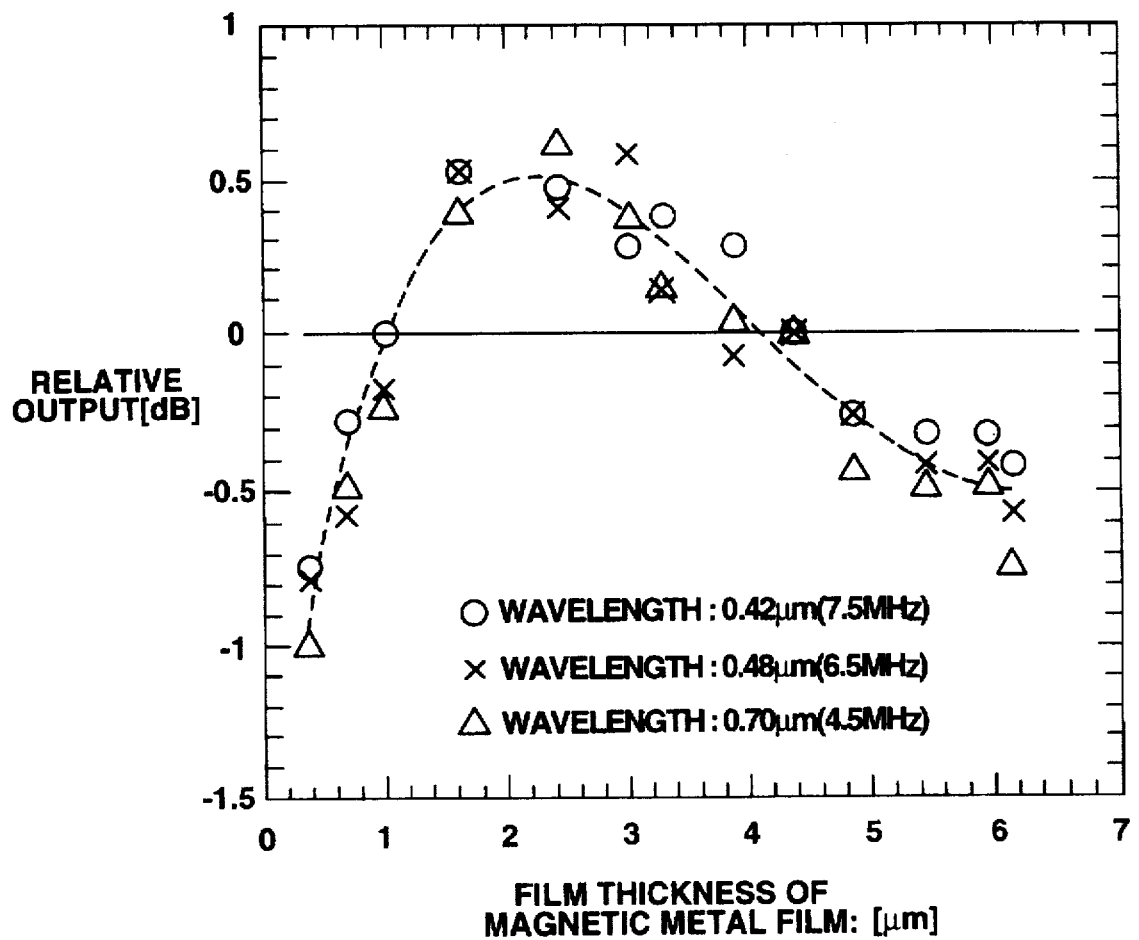
FIG. 4 is a graph showing magnetic metal film thickness dependency of recording characteristics.

FIG. 4 shows relative values of the playback output at respective recording wavelengths with the use of magnetic heads of different film thicknesses as the recording heads, that is the magnetic metal film thickness dependency of the recording characteristics. In the drawing, a broken line represents an approximate quadrature curve for data for the respective wavelengths. The ordinate and the abscissa denote playback characteristics of the respective magnetic heads in terms of relative outputs for the peak output of the approximate curve of +0.5 dB, and the film thicknesses of the respective magnetic heads, respectively.

It is seen from these results that, for realizing an output within −0.5 dB (0 dB or more in the drawing) from the peak output for the signals having the wavelength ranging from 0.4 μm to 0.7 μm, it suffices to set the film thickness of the recording head so as to be not less than 1.0 μm and not more than 4.4 μm. It is felt that, if the film thickness is set so as to be 1.0 μm or less, there is not produced a sufficient recording magnetic field from the recording head, so that the recording characteristics are worsened.

It is seen from the above experimental results that, by employing, as a recording head, a magnetic head having a gap length of 0.23 μm to 0.32 μm, and a magnetic metal film having a film thickness not less than 1.0 μm and not more than 4.4 μm, the recording characteristics in the short wavelength range of 0.4 to 0.7 μm and hence the playback output may be improved. The above-described construction of the magnetic head, as means for developing a high playback output for the short wavelength range, may find extensive application in magnetic recording apparatus in general capable of separately loading recording/playback heads.

Although the foregoing description has been made of a magnetic recording head having thin magnetic metal films formed on both of the magnetic core halves, the present invention may also be applied to a magnetic head having a thin magnetic metal film formed on only one of the magnetic core halves.

What is claimed is:

1. A metal-in-gap magnetic head having first and second magnetic core halves with a magnetic metal film formed on at least the region of a magnetic gap between said core halves, wherein the improvement resides in that each of said first and second magnetic core halves has a planar surface confronting and parallel relative to one another across said magnetic gap, and a pair of inclined surfaces disposed on opposite sides of said planar surfaces rendering each of said core halves in a tapered shape;

a first magnetic metal film and a second magnetic metal film formed on said first and second magnetic core halves, respectively, to cover said planar surface and said inclined surfaces of each of said core halves;

said magnetic metal films having a thickness in a direction perpendicular to the magnetic gap of not less than 1.0 μm and not more than 4.4 μm, and said magnetic gap having a length of not less than 0.23 μm and not more than 0.32 μm; and wherein said head is capable of recording signals having wavelengths in the range of 0.4 μm to at least 0.7 μm.

2. The magnetic head according to claim 1, wherein at least one of said first and second magnetic metal films is composed of an alloy selected from the group consisting of: Fe—Al—Si, Fe—Al, Fe—Si—Co, Fe—Ni, Fe—Al—Ge, Fe—Ga—Ge, Fe—Si—Ge, Fe—Co—Si—Al, Fe—Ga—Si.

3. The magnetic head according to claim 1, wherein at least one of said first and second magnetic metal films is composed of an alloy composed of Fe, Ga, Co and substituting part of Fe with Si, and admixed with at least one element selected from Ti, Cr, Mn, Zr, Nb, Mo, Ta, W, Ru, Os, Rh, Ir, Re, Ni, Pd, Pt, Hf, and V.

4. The magnetic head according to claim 1, wherein at least one of said first and second magnetic metal films is composed of an amorphous alloy composed of at least one element selected from the group consisting of Fe, Ni, Co; and one or more element selected from the elements P, C, B, and Si.

5. The magnetic head according to claim 4, wherein said amorphous alloy further contains an element selected from the group consisting of Al, Ge, Be, Sn, In, Mo, W, Ti, Mn, Cr, Zr, Hf, and Nb.

6. The magnetic head according to claim 5, wherein said amorphous alloys are further composed of transition elements selected from the group consisting of Co, Hf, Zr, and rare earth elements.

7. The magnetic head according to claim 1, wherein said magnetic head comprises winding slots having coils wound there around, side winding slots formed as windows traversing said core halves at a mid portion of a substrate portion along a direction of depth of said magnetic gap.

* * * * *